Dec. 18, 1934.  C. E. CHAPPLE  1,985,149

FAUCET VALVE

Filed Dec. 9, 1933

Inventor
Charles E. Chapple

By Clarence A. O'Brien
Attorney

Patented Dec. 18, 1934

1,985,149

UNITED STATES PATENT OFFICE 1,985,149

FAUCET VALVE

Charles Edwin Chapple, Batavia, N. Y.

Application December 9, 1933, Serial No. 701,707

2 Claims. (Cl. 251—139)

This invention relates to a valve assembly for a faucet, the general object of the invention being to provide means whereby the valve will adjust itself on the seat, the valve will not rotate with the handle operated stem of the faucet and the parts being so arranged and constructed that the flexible washer forming part of the valve assembly will be subjected to little wear so that it will last for a long time, with the parts being easily replaceable when necessary.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:—

Figure 1:
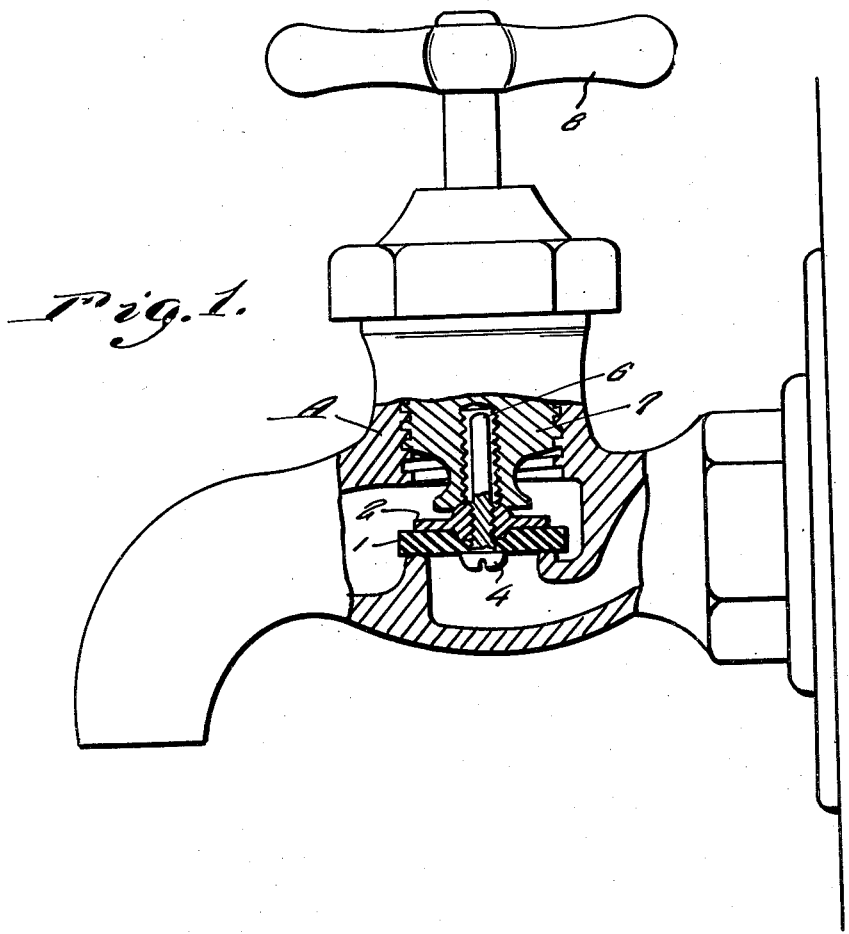
Figure 1 is an elevation of a faucet, with parts broken away to show the invention.
Figure 3:
Figure 3 is a perspective view of the metal part of the device.
Figure 2:
Figure 2 is a top plan view of the valve member.

As shown in this drawing, the valve member is composed of the washer 1 of resilient material and the disk or plate 2 of metal. The member 2 is formed with the hub 3 which has parts extending above the member and below the member and the upper part is spherical or tapered, as shown, while the lower part is also tapered or spherical, and this lower part fits in a recess in the upper face of the washer 1. A screw 4 has a threaded part passing through the washer and the hub 3 of the member 2, with the rest of the screw unthreaded and fitting in an enlarged opening 6 formed in the stem 7 of the faucet A, the stem being rotated by the handle 8, as usual. The lower end of the opening 6 is enlarged and slightly rounded to receive the upper end of the upper part of the hub, as shown in Figure 1.

From the foregoing, it will be seen that the valve member, composed of the parts 1 and 2, is not connected with the stem, so that these parts will not rotate with the stem, but as the stem moves downwardly, its lower end, pressing upon the upper end of the hub, will press the valve member against the seat of the faucet and that when the stem is raised, the fluid in the faucet will press the valve member upwardly so that the fluid can pass from the faucet. The hole in the washer through which the screw 4 passes should be made larger than the diameter of the screw so as to provide a clearance and this clearance is centralized by the tapered lower part of the hub and overcomes tendency of the washer to but partly cover the seat.

If the stem should be out of alignment with the seat of the faucet at the time of closure of the faucet, the pressure of the stem on the valve member will be by full circular contract rather than at a single point and thus the pressure on the washer will be equalized and a tighter and more positive seal obtained.

The construction of the device is such that it will minimize the wear and destruction of the washer and the parts can be easily replaced when worn or damaged.

By making the metal flange or plate and stem or screw separable, I have made possible the ready interchange of the washer proper with balance of assembly, so that washers of variable sizes may be used with the same flange or plate and stem; this feature also automatically makes possible the re-use of the metal portions of the assembly when it becomes necessary or desirable to replace the washer proper.

By making the upper hub of the plate or flange spherical or tapered in shape, I have minimized the friction occasioned by the rotative pressure of the faucet stem against the flange at the moment of closure of the faucet, as this construction presents merely a line contact rather than a flat faced contact.

Due to the face of the upper hub of the flange being spherical or tapered in form, I have provided positive means of centering the flange with the screw hole in the faucet stem.

Due to the upper hub of the flange being spherical or tapered in form, the pressure of the stem of the faucet against the washer assembly is equalized as the contact between the stem and the flange is circular, avoiding the pressure of the stem being applied at one point on the washer should the face of the faucet stem be out of parallel with the seat of the faucet port. This makes a more positive seal and also minimizes the wearing away of the washer which accompanies unequal pressure.

By reason of the spherical or tapered shape of the upper hub extension, a portion of the hub recedes into the tapered hole of the faucet stem and decreases the head room occupied by the assembly, making possible a fuller opening of the faucet so that the flow of the fluid is not restricted and a full port opening provided.

By providing an extended hub on the upper face of the flange, greater mechanical strength of the device on the assembly is obtained as this construction permits of a greater number of threads being engaged by the screw.

The bottom face of the flange may be provided with a hub extension, made either spherical or tapered to still further increase the mechanical strength of the assembly by reason of a greater number of threads being engaged by the screw.

By providing the bottom face of the flange with a hub extension made spherical or tapered in shape, means are provided for centering the position of the washer in relation to the flange and so brings all portions of the assembly into concentricity with one another, and prevents the insufficient seal which might occur if the washer was eccentric with the hole or seat of the faucet port and did not fully cover the seat.

By providing the bottom face of the flange with a spherical or tapered hub extension, which when drawn into position with the washer, forms a seal at this point between the washer and the flange by reason of the wedging action of the spherical or tapered hub against the side wall of the hole of the washer or against the side wall of a recess in the upper portion of the washer hole when such a form of construction is found to be desirable, seepage of the fluid past the washer at this point is prevented. In addition, a seal is formed by the pressure of the head of the screw against the bottom face of the washer.

It is thought from the foregoing description that the advantages and novel features of the invention will be readily apparent.

It is to be understood that changes may be made in the construction and in the combination and arrangement of the several parts, provided that such changes fall within the scope of the appended claims.

What is claimed is:—

1. In a faucet, a body having a vertically arranged tubular part therein having its upper end flat to form a valve seat, a vertically adjustable stem in the body having its lower end flat, the lower part of the stem having a vertically arranged bore therein opening out through the flat lower end of the stem with the lower end of the bore enlarged and substantially semi-spherical, a plate having a centrally arranged hub provided with a threaded bore and a flange surrounding the hub, said hub projecting from the upper and lower faces of the plate and having its ends substantially semi-spherical, the upper end fitting in the enlarged part of the bore of the stem, a resilient flat washer having its upper face contacting the lower face of the plate and a portion of its lower face adapted to contact the seat, with the lower portion of the hub embedded in the washer and a screw passing through the washer and the hub and fitting loosely in the bore of the stem, the flange of said plate being spaced from the lower end of the stem.

2. In a faucet, a body having a vertically arranged tubular part therein having its upper end flat to form a valve seat, a vertically adjustable stem in the body having its lower end flat, the lower part of the stem having a vertically arranged bore therein opening out through the flat lower end of the stem with the lower end of the bore enlarged, a plate having a centrally arranged hub provided with a threaded bore and a flange surrounding the hub, said hub projecting from the upper and lower faces of the plate, the upper portion of the hub partially seated in the enlarged part of the bore of the stem, a resilient flat washer having its upper face contacting the lower face of the plate and a portion of its lower face adapted to contact the seat, the lower hub embedded in the washer, a screw passing through the washer and the hub and fitting loosely in the bore of the stem, and the flange of said plate being spaced from the lower end of the stem by the free portion of the upper portion of the hub.

CHARLES E. CHAPPLE.